UNITED STATES PATENT OFFICE 2,585,210

PIPERIDINE CARBOXYLIC ACID ESTERS

Noel F. Albertson, East Greenbush, N. Y., assignor to Sterling Drug Inc., New York, N. Y., a corporation of Delaware No Drawing. Application February 26, 1949, Serial No. 78,673

2 Claims. (Cl. 260—294)

This invention relates to a process for the preparation of piperidine derivatives and to the products of said process.

More particularly, this invention relates to the preparation of 3-piperidinecarboxylic esters.

It is an object of my invention to provide a convenient and economical method for obtaining piperidine derivatives which are useful per se as pharmaceutical compounds or which are useful as intermediates for the preparation of pharmaceutical compounds.

My invention comprises catalytically hydrogenating an alpha-carboxylic acyl-gamma-cyano carboxylic ester to yield a 3-piperidine-carboxylic ester in accordance with the following general equation:

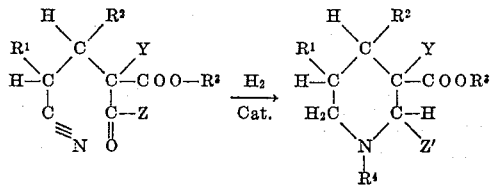

wherein $R^1$, $R^2$ Y, and Y' are hydrogen or substituent groups which do not interfere with the catalytic hydrogenation process; $R^3$ is a lower alkyl group; $R^4$ is hydrogen or taken together with Y' represents a divalent 1,3-aliphatic linkage such as —CO—CH$_2$—CH$_2$—, etc.; and Z and Z' are substituent groups (i. e. other than hydrogen) which do not interfere with the catalytic hydrogenation. Except in those instances when Y and Z contain functional groups reducible under catalytic hydrogenation conditions, Y' is identical with Y and Z' is identical with Z. In a specific modification of my process, the groups $R^3$ and Y or Y' taken together can represent a lower aliphatic bridge having 3-4 carbon atoms in the bridge, which itself can have further substituents.

The groups Y and Y' can be hydrogen, a hydrocarbon radical, or a substituted hydrocarbon radical. Examples of these hydrocarbon and substituted hydrocarbon radicals which are included within the purview of my invention are: aliphatic radicals, such as alkyl and substituted alkyl radicals, for example methyl, ethyl, n-propyl, isopropyl, n - butyl, n - hexyl, 2-carbomethoxyethyl, 2-carbethoxyethyl, etc.; cycloaliphatic radicals such as cycloalkyl radicals, for example cyclohexyl, cyclopentyl, etc.; araliphatic radicals such as aralkyl radicals, for example benzyl, phenethyl, p-chlorophenethyl, etc.; and aryl radicals such as phenyl and substituted phenyl radicals, for example 4-methoxyphenyl, 4-chlorophenyl, 3-dimethylaminophenyl, etc.

When the radical Y in the starting material contains a grouping reactive to hydrogenation under catalytic conditions, this reactive grouping is reduced of course during the catalytic hydrogenation, and the piperidine product will contain the reduced grouping.

When the radical Y contains a grouping which is capable of reacting with the =NH group of a piperidine ring under reducing conditions, my new process affords a convenient route for obtaining bicyclo piperidine derivatives. Alternatively, of course, a desired reactive grouping in Y may be formed in situ during the hydrogenation reaction. For example, when Y is a 2-carbomethoxyalkyl group, the formation of the monocyclic piperidine is accompanied by a substantial yield of the 1-azabicyclo[3.3.1]nonane-5-carboxylic ester having the formula

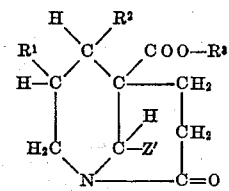

as the result of the intramolecular elimination of CH$_3$OH by interaction of the =NH and carbomethoxy groups.

The grouping Z—CO— in my starting materials represents a carboxylic acyl group such as acetyl, propionyl, benzoyl, 4-chlorobenzoyl, etc., and thus the group Z itself represents the hydrocarbon or substituted hydrocarbon residue of a carboxylic acid other than formic acid, such as a fatty acid or an aromatic carboxylic acid.

The groups $R^1$ and $R^2$, which can be any groups not interfering with the catalytic hydrogenation process, can be, for example, hydrogen or hydrocarbon radicals such as lower alkyl groups, e. g. methyl, ethyl, etc.; aralkyl groups, e. g. benzyl, phenethyl, etc.; aryl groups, e. g. phenyl, 4-dimethylaminophenyl, 4-ethoxyphenyl, etc.; and cycloaliphatic groups, e. g. cyclohexyl, cyclopentyl, etc.

As the starting materials for the process of my invention, I prefer usually to employ a lower alkyl ester of the requisite alpha-acyl-gamma-cyano carboxylic acid, and thus the group $R^3$ is preferably a lower alkyl group such as methyl, ethyl, n-propyl, isopropyl, n-butyl, n-hexyl, etc. However, when the two groups Y and $R^3$ taken together represent a lower alkylene group having 2-3 carbon atoms, for example the 1,2-ethylene radical, the ester is of the lactone type, i.e. an inner ester. In this modification of my invention, the piperidine derivative obtained by catalytic hydrogenation contains a spiro grouping at the 3-position of the piperidine ring. The reaction is illustrated by the following equation:

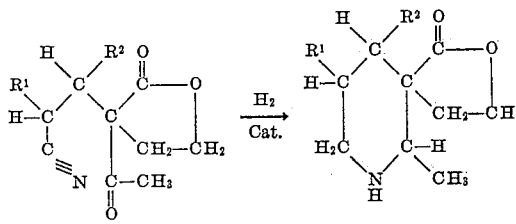

When the two groups Y and Z taken together represent a divalent lower aliphatic bridge, for example a 1,3-propylene *radical*, the alpha-acyl group is a part of a ring, of course, and the piperidine derivative obtained by catalytic hydrogenation is a bicyclo compound. This modification of my invention is illustrated by the following equation:

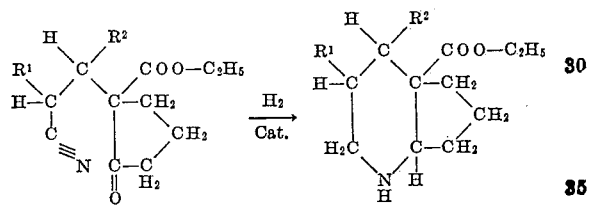

The starting materials can be prepared by Michael condensation of acrylonitrile or the appropriately substituted acrylonitrile with an acylacetic ester, in accordance with the following equation:

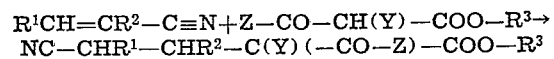

The starting materials are of course chosen in accordance with the specific choices of the groups $R^1$, $R^2$, $R^3$, $R^4$, $Y'$ and $Z'$ in the particular 3-piperidinecarboxylic ester desired as a product of the catalytic hydrogenation reaction. Specific examples of the 3-piperidinecarboxylic esters included in my invention and the corresponding starting materials required for the catalytic hydrogenation include:

Ethyl 2-methyl-3-benzyl-3-piperidinecarboxylate,

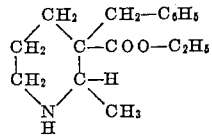

from ethyl alpha-acetyl-alpha-benzyl-gamma-cyanobutyrate;
Ethyl 2-phenyl-3-(n-hexyl)-3-piperidinecarboxylate,

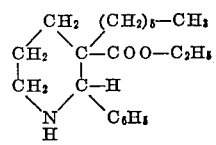

from ethyl alpha - benzoyl - alpha - (n - hexyl) - gamma-cyanobutyrate;

Methyl 2-methyl-3-(n-heptyl)-3-piperidinecarboxylate,

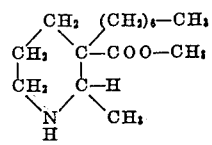

from methyl alpha-acetyl-alpha-(n-heptyl)-gamma-cyanobutyrate;
Ethyl 2-methyl-3-(2-carbomethoxyethyl)-3-piperidinecarboxylate,

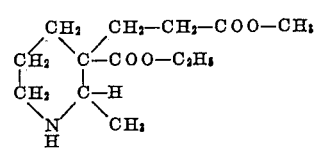

and 5-carbethoxy-9-methyl-2-oxo-1-azabicyclo-[3.3.1]nonane,

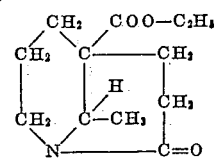

from ethyl alpha-acetyl-alpha-(2-carbomethoxyethyl)-gamma-cyanobutyrate;
Ethyl 2 - methyl - 3 - (2 - carbethoxyethyl) - 3-piperidinecarboxylate,

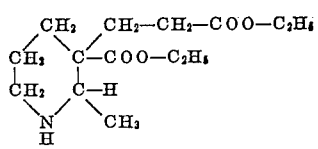

from ethyl alpha-acetyl-alpha-carbethoxyethyl-gamma-cyanobutyrate;
Ethyl 2-methyl-3-methyl-3-piperidinecarboxylate,

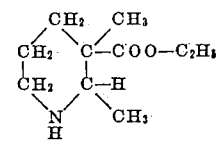

from ethyl alpha-acetyl-alpha-methyl-gamma-cyanobutyrate;
4a-Carbethoxy-octahydro-1-pyrindine,

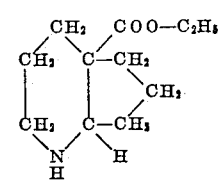

from ethyl 1-(2-cyanoethyl)-2-oxo-1-cyclopentanecarboxylate;
1-methyl-2-aza-8-oxaspiro(5.4)decan-7-one,

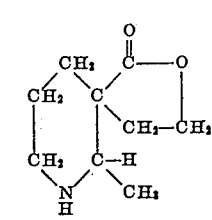

from 3-acetyl-4,5-dihydro-2(3)-furanone;

Ethyl 2-methyl-3-piperidinecarboxylate,

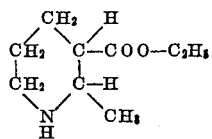

from ethyl alpha-acetyl-gamma-cyanobutyrate;
Ethyl 2-phenyl-3-piperidinecarboxylate,

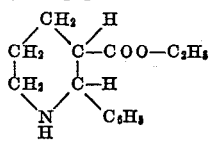

from ethyl alpha-benzoyl-gamma-cyanovalerate;
Methyl 2-n-propyl-5-methyl-3-piperidinecarboxylate,

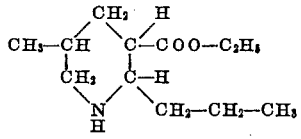

from methyl alpha-butyryl-gamma-cyanovalerate; and
n - Propyl 2,3-diethyl-4-methyl-3-piperidinecarboxylate,

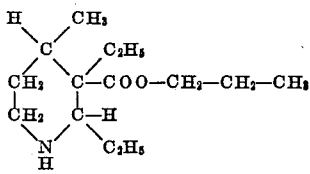

from n-propyl alpha-propionyl-gamma-cyanoisovalerate.

As the hydrogenation catalyst in carrying out the process of my invention, I can employ any of the usual metal catalysts employed in catalytic hydrogenation reactions. As a matter of convenience and economy, I prefer to employ a nickel catalyst such as Raney nickel, but a noble metal catalyst such as palladium can also be employed successfully. The temperature and pressure conditions for the reaction will vary somewhat with the choice of starting material as well as with choice of catalyst, but when using Raney nickel catalyst, for example, it is convenient to conduct the reaction at about 50–1000 lbs./sq. in. hydrogen pressure and 40–150° C.

It is generally preferable, but not necessary, to conduct the hydrogenation reaction in an organic solvent. The choice of solvent is not critical, however, and any solvent not interfering with the reaction can be employed. It is frequently convenient to use a lower aliphatic alcohol such as methyl alcohol or ethyl alcohol as the solvent.

It will be appreciated that my invention comprehends not only a new synthesis of piperidine derivatives, but also the new piperidine products of said process. Broadly speaking, my new compounds contain a 3-piperidinecarboxylic ester nucleus and have the general structural formula set forth hereinbefore, viz.

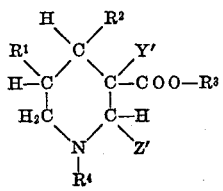

A preferred group of my new compounds includes those piperidines of the above formula wherein $R^1$ and $R^2$ represent hydrogen or lower alkyl radicals containing 1-4 carbon atoms and $R^3$ represents a lower alkyl radical containing 1-6 carbon atoms.

More particularly, I prefer the compounds having the formula

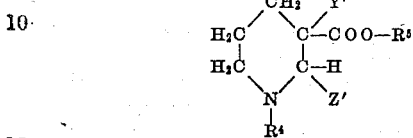

where $R^5$ is a lower alkyl radical containing 1-6 carbon atoms. These include, for example, the following types of compounds:

Lower alkyl 2-alkyl-3-alkyl-3-piperidinecarboxylates having the formula:

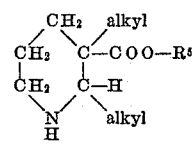

Lower alkyl 2-monocyclic aryl-3-alkyl-3-piperidinecarboxylates having the formula

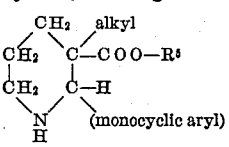

Lower alkyl 2-alkyl-3-monocyclic aryl-3-piperidinecarboxylates having the formula:

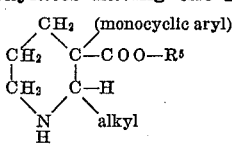

Lower alkyl 2-alkyl-3-cycloalkyl-3-piperidinecarboxylates having the formula:

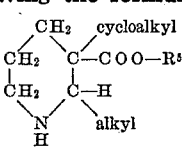

Lower alkyl 2-alkyl-3-aralkyl-3-piperidinecarboxylates having the formula:

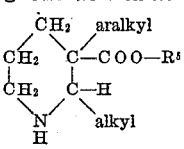

Lower alkyl 1-azabicyclo[3.3.1]nonane-5-carboxylates having the formula:

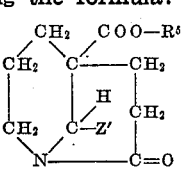

My new compounds exhibit useful physiological activities and, moreover, are readily converted to pharmaceutically useful compounds. For example, these 3-piperidinecarboxylic esters can be converted by reduction with sodium and alcohol, or lithium aluminum hydride to the corresponding 3-piperidinemethanols.

My invention is illustrated by the following examples without, however, being limited thereto.

EXAMPLE 1

*Ethyl 2-methyl-3-benzyl-3-piperidinecarboxylate*

A. 0.5 g. of sodium was added to 200 ml. of ethanol, and to this solution there was added 168 g. of ethyl benzylacetoacetate. To this mixture there was added with stirring 53 ml. of acrylonitrile at such a rate that the temperature of the reaction mixture remained at 25–35° C. One-half hour after the addition of the acrylonitrile was completed, the mixture was acidified with alcoholic hydrogen chloride. The mixture was then distilled and there was obtained 141 g. of ethyl benzyl-(2-cyanoethyl)-acetoacetate, B. P. 152° C. at 2.0 mm., $n_D^{25}$ 1.5002. There was also recovered 35 g. of ethyl benzylacetoacetate.

B. 140 g. of ethyl benzyl-(2-cyanoethyl)-acetoacetate was dissolved in 460 ml. of ethanol and the solution was hydrogenated in the presence of Raney nickel at 80° C. and 500 lbs. per square inch hydrogen pressure. The reaction required about five hours. After completion of the reduction, the solution was filtered to remove the catalyst and the filtrate was concentrated. There was thus obtained 131 g. of a basic oil, which when distilled yielded 114 g. of ethyl 2-methyl-3-benzyl-3-piperidinecarboxylate, which distilled at 134–140° C. at 1.4 mm. Nitrogen analysis: Calculated, 5.36% N; observed, 5.34% N.

EXAMPLE 2

*1-methyl-2-aza-8-oxaspiro[5.4]decan-7-one*

A. 2 g. of sodium was dissolved in 300 liters of ethanol, and to this solution was added 512 g. of 3-acetyl-4,5-dihydro-2(3)-furanone. To this mixture there was added, with stirring, 290 ml. of acrylonitrile. About one hour after the addition of the acrylonitrile was completed, the mixture was acidified with alcoholic hydrogen chloride. The acidified reaction mixture was allowed to stand, and after two days there crystallized from the mixture, in a yield of 86–92%, 3-acetyl-2-3-(2-cyanoethyl)-4,5-dihydro-2(3)-furanone.

B. 181 g. of 3-acetyl-3-(2-cyanoethyl)-4,5-dihydro-2(3)-furanone in 400 ml. of methanol was hydrogenated in the presence of Raney nickel at 90° C. and 500 lbs. per square inch initial hydrogen pressure. The hydrogenation required about six hours. After removal of the catalyst, the reaction mixture was treated with alcoholic hydrogen chloride, whereupon there precipitated from solution 62 g. of 1-methyl 2-aza-oxaspiro-[5.4]decan-7-one hydrochloride, M. P. 252–255° C. after recrystallization from ethanol, the product melted at 265–266° C. Nitrogen analysis: Calculated, 6.81% N; found, 6.82% N.

EXAMPLE 3

*Ethyl 2-methyl-3-(2-carbomethoxyethyl)-3-piperidinecarboxylate* and

*5-carbethoxy-9-methyl-2-oxo-1-azabicyclo[3.3.1]nonane*

A. 0.5 g. of sodium was dissolved in 60 ml. of ethanol and to this solution was added 43.2 g. of ethyl (2-carbomethoxyethyl)-acetoacetate. 15 ml. of acrylonitrile was then dripped into the mixture with stirring. The reaction mixture was acidified and then partitioned between water and chloroform. The chloroform layer was separated and distilled. There was thus obtained 53 g. of ethyl (2-carbomethoxyethyl)-(2-cyanoethyl)-acetoacetate distilling at 149–175° C. at 1.6 mm. On redistillation the product boiled at 165–166° C. at 1.7 mm.

B. 93 g. of ethyl (2-carbomethoxyethyl)-(2-cyanoethyl)-acetoacetate was dissolved in 400 ml. of ethanol and the solution was hydrogenated in the presence of Raney nickel at 100° C. and 500 lbs. per square inch initial hydrogen pressure. The hydrogenation required six hours. The catalyst was removed from the hydrogenation mixture and the alcohol was removed in vacuo. The residue thus obtained was diluted with ether and filtered. The residue on the filter paper was 26.1 g. of 5-carbethoxy-9-methyl-2-oxo-1-azabicyclo[3.3.1]nonane, M. P. 162–164° C. Nitrogen analysis: Calculated, 6.22% N; found, 6.27% N. Concentration of the ethereal filtrate gave 50.9 g. of oil which on distillation gave 37.9 g. of ethyl 2-methyl-3-(2-carbomethoxyethyl)-3-piperidinecarboxylate, B. P. 139° C. at 1.4 mm., $n_D^{25}$ 1.4740. Nitrogen analysis: Calculated, 5.44% N; found, 5.26% N. The distillation residue was triturated with ether and there was obtained therefrom a further yield of 5-carbethoxy-9-methyl-2-oxo-1-azabicyclo[3.3.1]nonane, which when recrystallized from ethanol melted at 170–171° C.

EXAMPLE 4

*4-carbethoxyoctahydro-1-pyrindine*

A solution of 115 g. of ethyl 2-(2-cyanoethyl)-cyclopentanone-2-carboxylate in 400 ml. of ethyl alcohol was hydrogenated in the presence of Raney nickel at 120° C. and 400 lbs. per square inch hydrogen pressure. The hydrogenation required seven hours. After removal of the catalyst the hydrogenation mixture was distilled, thereby yielding 79 g. of 4a-carbethoxy-1-cyclopenta(b)-octahydropyrindine, B. P. 87° C. at 0.6 mm., $n_D^{25}$ 1.4799. Analysis: Calculated, 66.96% C; 9.71% H; and 7.10% N. Found, 66.98% C; 9.89% H; and 7.00% N.

EXAMPLE 5

*Ethyl 2-methyl-3-piperidinecarboxylate*

A solution of 183 g. of ethyl (2-cyanoethyl)-acetoacetate in 420 ml. of alcohol was hydrogenated in the presence of Raney nickel at 80° C. and 700 lbs. per square inch initial hydrogen pressure. After removal of the catalyst, the reaction mixture was concentrated and distilled. There was thus obtained 86 g. of ethyl 2-methyl-3-piperidinecarboxylate, boiling at 59° C. at 0.5 mm. Nitrogen analysis: Calculated, 8.18% N; found, 7.94% N.

EXAMPLE 6

*Ethyl 2,3-dimethyl-3-piperidinecarboxylate*

A solution of 60.8 g. of ethyl methyl-(2-cyanoethyl)-acetoacetate in 340 ml. of alcohol was hydrogenated in the presence of Raney nickel at 75° C. and 400 lbs. per square inch hydrogen pressure. After removal of the catalyst, the reaction mixture was concentrated and distilled. There was thus obtained 50.9 g. of ethyl 2,3-dimethyl-3-piperidinecarboxylate, B. P. 63° C. at 0.1 mm. Nitrogen analysis: Calculated, 7.56% N; found, 7.58% N.

EXAMPLE 7

*Ethyl 2-phenyl-3-piperidinecarboxylate*

A solution of 165 g. of ethyl-(2-cyanoethyl)-benzoylacetate in 335 ml. of alcohol was reduced with Raney nickel catalyst at 760 lbs. per square inch hydrogen pressure at 115° C. After removal of the catalyst and solvent, there was obtained 113 g. of ethyl 2-phenyl-3-piperidinecarboxylate, B. P. 118–121° C. at 0.08 mm. Nitrogen analysis: Calculated, 6.00% N; found, 5.78% N.

EXAMPLE 8

*Ethyl 2-methyl-3-(2-carbethoxyethyl)-3-piperidinecarboxylate*

A. 0.5 g. of sodium was dissolved in 120 ml. of ethanol and to this solution there was added 90.5 g. of ethyl (2-carbethoxyethyl)-acetoacetate. 30 ml. of acrylonitrile was then dripped into the mixture with stirring. After four hours, the reaction mixture was acidified with acetic acid and then concentrated in vacuo. The concentrated solution was partitioned between water and ether. The ether layer was separated and dried, then concentrated, and finally distilled. There was thus obtained 91 g. of ethyl (2-carboxyethyl)-(2 - cyanoethyl) - acetoacetate boiling at 161–176° C. at 0.8 mm. Nitrogen analysis: Calculated, 4.95% N; found, 5.05% N.

B. A solution of 73 g. of ethyl (2-carbethoxyethyl)-(2-cyanoethyl)-acetoacetate in 325 ml. of ethanol was hydrogenated in the presence of Raney nickel catalyst at 114° and 700 lbs. per square inch hydrogen pressure. After removal of the catalyst and solvent, there was obtained by distillation 45 g. of ethyl 2-methyl-3-(2-carbethoxyethyl)-3-piperidinecarboxylate boiling at 129–134° C. at 0.7 mm. Analysis—Calculated: C, 61.98; H, 9.29; N, 5.16. Found: C, 61.96; H, 9.04; N, 5.32.

EXAMPLE 9

*Ethyl 2-methyl-3-(n-heptyl) - 3 - piperidinecarboxylate*

A solution of 111 g. of ethyl (2-cyanoethyl)-(n-heptyl)-acetoacetate in 400 ml. of ethanol was hydrogenated in the presence of a Raney nickel catalyst at 80° C. and 600 lbs. per square inch hydrogen pressure. After removal of the catalyst and solvent, there remained 104 g. of liquid, most of which boiled at 127–138° C. at 1.1 mm. Redistillation of this fraction yielded 66.5 g. of ethyl 2-methyl-3-(n - heptyl) -3-piperidinecarboxylate, boiling at 112–117° C. at 0.7 mm. Analysis—Calculated: C, 71.33; H, 11.60; N, 5.20. Found: C, 71.13; H, 10.96; N, 5.23.

It will be appreciated that all of my new compounds are basic amines, and I have found that they form salts by neutralization with a wide variety of acids. In this manner, for example, the hydrochlorides, sulfates, citrates, benzoates, etc. can be prepared. The salts and the free bases are equivalent for many chemical and pharmaceutical purposes and the choice of the form in which they will be used in a particular instance will depend on whether they are to be used in aqueous solution, in which case a salt can be used, or in an organic medium, in which case the free base may be more satisfactory.

I claim:

1. A 3-piperidinecarboxylic ester having the formula

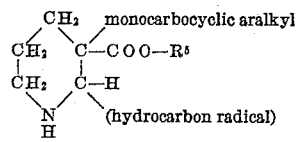

where $R^5$ is a lower alkyl group containing 1–6 carbon atoms.

2. Ethyl 2-methyl-3-benzyl - 3 - piperidinecarboxylate.

NOEL F. ALBERTSON.

REFERENCES CITED

The following references are of record in the file of this patent:

UNITED STATES PATENTS

| Number | Name | Date |
|---|---|---|
| 1,692,695 | Pope | Nov. 20, 1928 |
| 1,703,121 | Stolz | Feb. 26, 1929 |
| 1,714,180 | McEloain | May 21, 1929 |
| 1,724,248 | Adams | Aug. 13, 1929 |
| 1,784,903 | McEloain | Dec. 16, 1930 |
| 2,405,555 | Bergel et al. | Aug. 13, 1946 |
| 2,446,803 | Bergel et al. | Aug. 10, 1948 |

FOREIGN PATENTS

| Number | Country | Date |
|---|---|---|
| 574,061 | Great Britain | Dec. 19, 1945 |
| 584,877 | Great Britain | Jan. 24, 1947 |

OTHER REFERENCES

Albertson et al.: Jour. Amer. Chem. Soc., vol. 67 (1945).